United States Patent [19]
Thomas

[11] Patent Number: 5,882,046
[45] Date of Patent: Mar. 16, 1999

[54] DYNAMIC STRESS CONTROLLING FLEXIBLE HOSE SECTION

[75] Inventor: R. Winfield Thomas, West Lebanon, Ind.

[73] Assignee: Tru-Flex Metal Hose Corporation, West Lebanon, Ind.

[21] Appl. No.: 741,665

[22] Filed: Oct. 31, 1996

[51] Int. Cl.[6] .............................. F16L 27/10; F16L 21/00
[52] U.S. Cl. ........................................... 285/226; 285/236
[58] Field of Search ................................... 285/226, 236, 285/298, 299

[56] References Cited

U.S. PATENT DOCUMENTS 3,574,354   4/1971   Mischel ..................................... 285/226

FOREIGN PATENT DOCUMENTS

| | | | |
|---|---|---|---|
| 206813 | 2/1984 | Germany | 285/236 |
| 40-6221482 | 8/1994 | Japan | 285/236 |
| 627120 | 7/1949 | United Kingdom | 285/226 |
| 2230833 | 10/1990 | United Kingdom | 285/236 |
| 2278901 | 12/1994 | United Kingdom | 285/226 |

*Primary Examiner*—Eric K. Nicholson
*Attorney, Agent, or Firm*—Litman, McMahon & Brown, L.L.C.

[57] ABSTRACT

A flexible hose section for connecting upstream and downstream exhaust pipe sections of an exhaust system includes a corrugated body with opposite ends. The ends are fastened to ends of the exhaust pipe sections to convey fluids or bulk materials through the pipe system. The corrugations or the connections between the flexible hose and pipe section ends are arranged to accommodate axial, lateral, diagonal and torsional displacement between the system components.

3 Claims, 16 Drawing Sheets

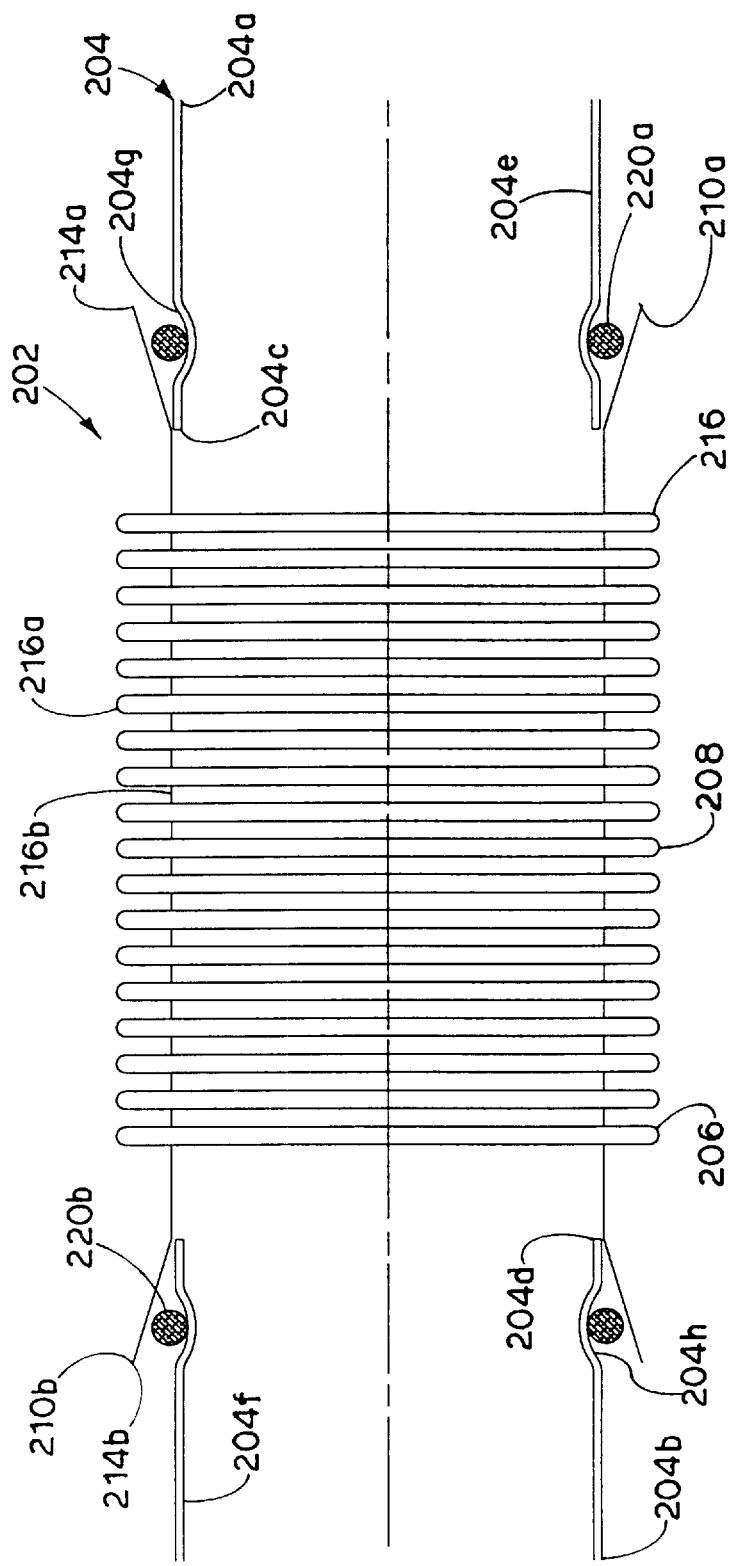

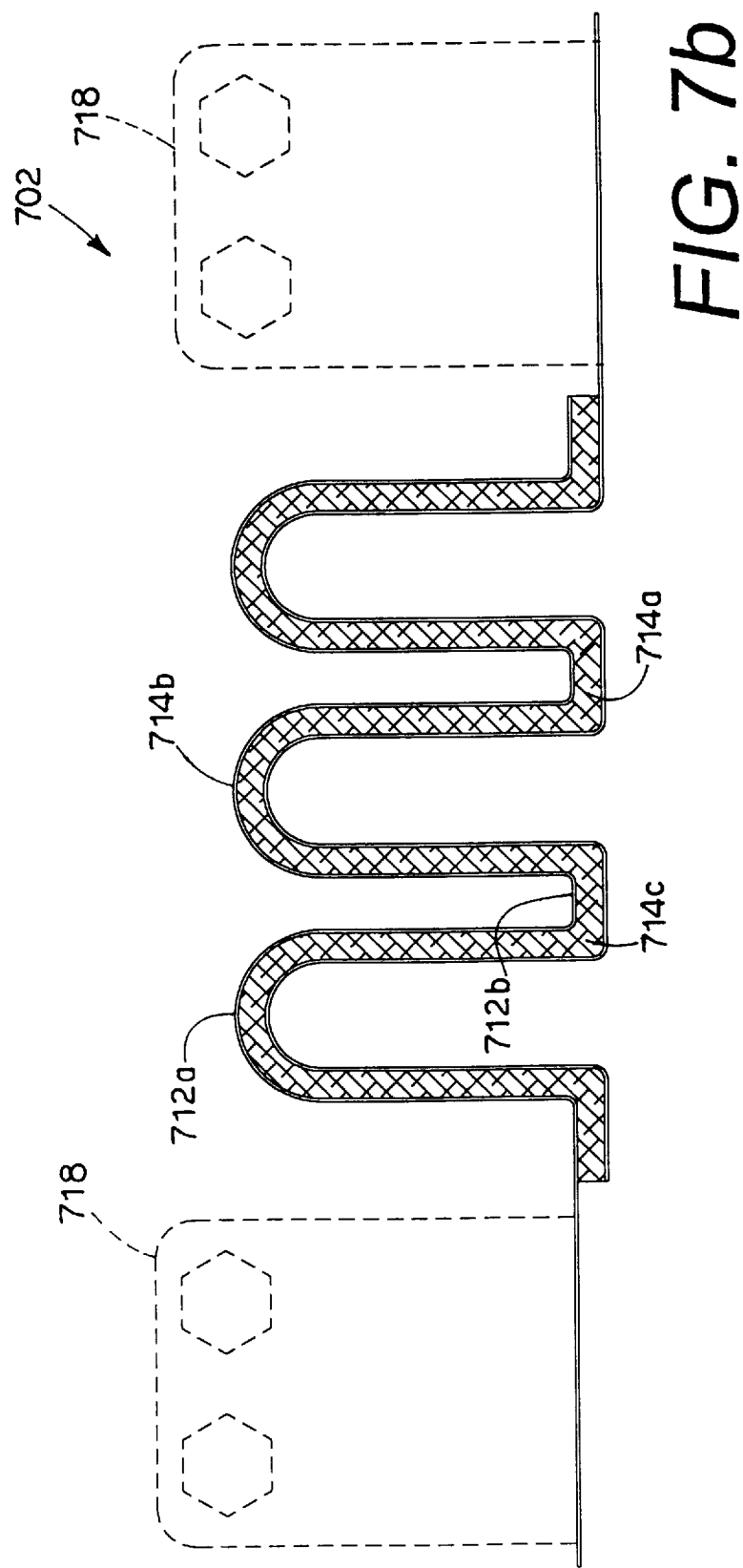

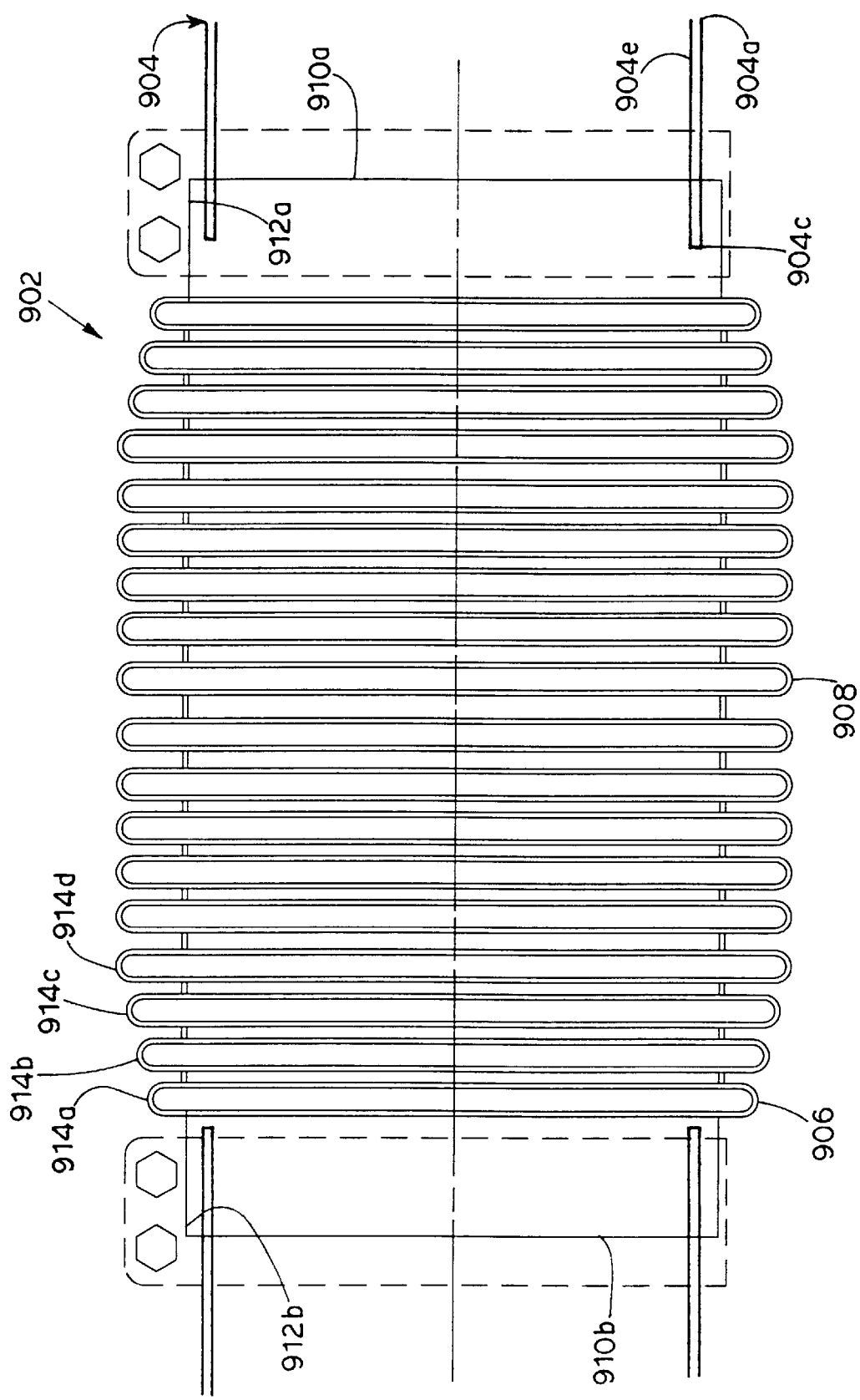

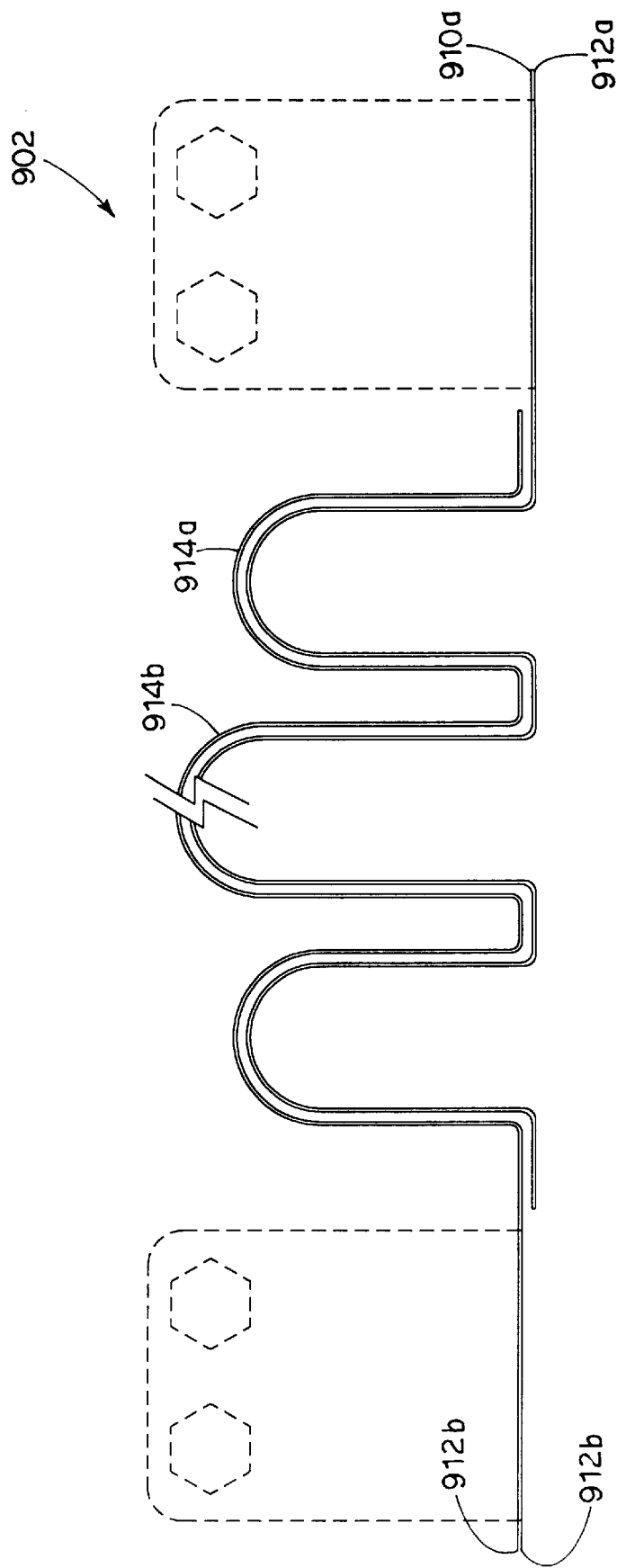

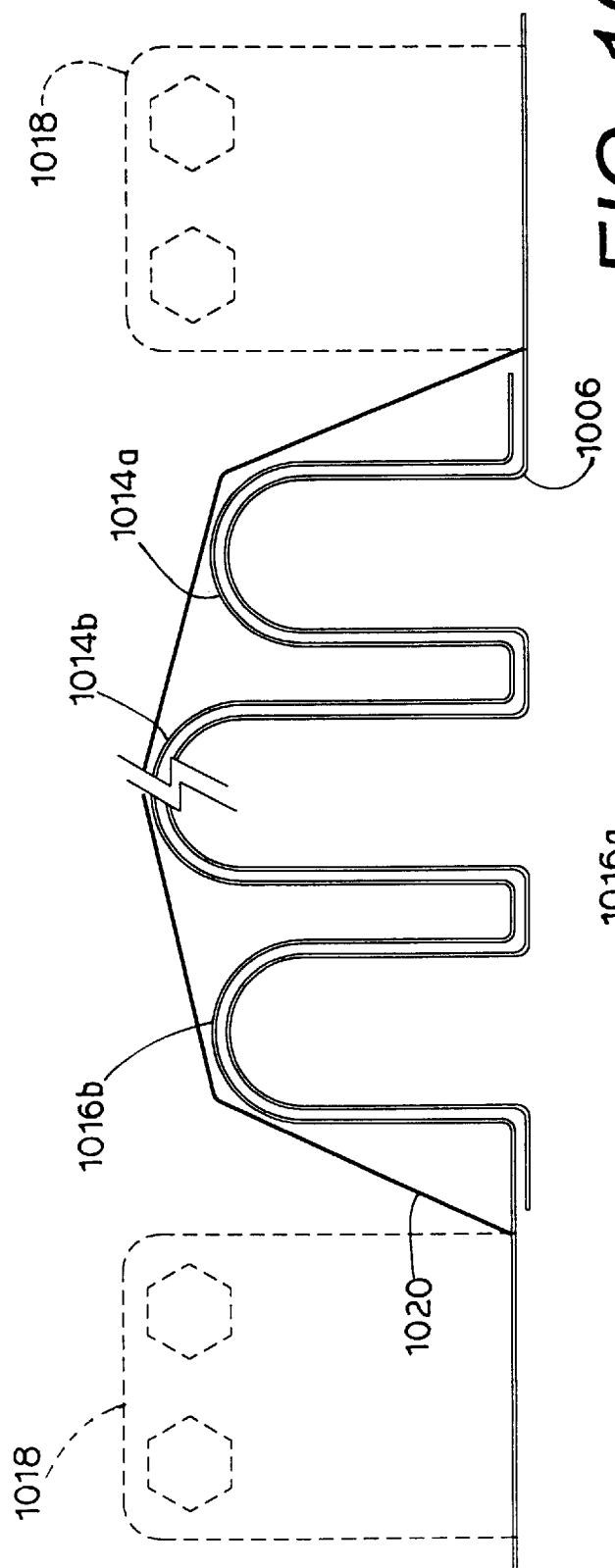

DYNAMIC STRESS CONTROLLING FLEXIBLE HOSE SECTION

BACKGROUND OF THE INVENTION

1. Field of the Invention

The present invention relates generally to flexible hoses, and in particular to a flexible hose section which controls dynamic stresses in a system with components which are subjected to differential dynamic forces.

2. Description of the Related Art

Conduit and piping systems for conveying fluids and bulk materials are used in a wide variety of applications. Various components for such systems have been devised to accommodate different fluids and materials and to operate in particular environments. For example, some of the components of such systems are fabricated from flexible metal hose, which offers the advantages of durability, flexibility, relatively low cost and adaptability to various sizes, configurations and materials.

Flexible metal hose has been used for many years to interconnect components which move relative to each other. Some of the common configurations of flexible metal hose include spiral-wound, edge-interlocked hose wherein the edges of a strip of sheet metal are interlocked on a hose winding machine to permit limited deflection of the resulting flexible metal hose. Corrugated flexible metal hose, on the other hand, can be roll-formed or spiral-wound using special rollers which shape the corrugations in either annular or spiral (helical) arrangements. The corrugations provide flexibility and permit a corrugated pipe or hose section to be bent and shaped more easily than a comparable hose section with smooth walls. Moreover, corrugations can permit a hose section to be bent around a relatively tight radius, and can dissipate dynamic stresses associated with the vibration of the components to which the flexible hose section is attached.

Corrugated flexible hose sections can have corrugations of different diameters, such as a bellows-type arrangement with the largest-diameter corrugations in the center and corrugations of decreasing diameters toward the ends whereby maximum flexibility is achieved in the center with increasing stiffness toward the ends. Such bellows-type configurations tend to be relatively efficient at dissipating vibrational energy along their entire lengths since their varying stiffness ratios tend to transmit vibrational energy toward their centers for dissipation.

Hybrid flexible metal hose sections have also been fabricated from corrugated sheet metal bands which are spiral wound with their edges interlocked. The resulting hose sections can provide the advantages of both interlocked-edge and corrugated types of flexible metal hose. Such hybrid hose designs can combine the advantages of both of these flexible metal hose types. At least for example, see the Thomas U.S. Pat. No. 5,494,319.

Exhaust systems for internal combustion engines are examples of relatively severe environments in which the operating characteristics of flexible metal hoses can be used to advantage. Flexible metal hose sections are often used for connecting the exhaust pipes from vehicle internal combustion engines with manifold mufflers, tail pipes and other exhaust system components. Flexible metal hose sections are commonly used in the exhaust systems of tractors of tractor-trailer truck rigs because of their flexibility, temperature resistance and corrosion resistance when fabricated from suitable materials, such as stainless steel.

Exhaust systems in general and vehicle exhaust systems in particular must perform reliably under relatively severe operating conditions, which can include temperature extremes, corrosive environmental factors and dynamic stress loading. Dynamic stresses in an exhaust system can originate from vibrations associated with the engine and movement of the vehicle. Such dynamic stresses include axial, lateral and diagonal forces, all of which can normally be effectively attenuated and controlled by flexible metal hose with corrugations and/or edge interlocking. However, torsional forces caused by the differential rotation of the exhaust system components connected by a flexible metal hose section can inflict significant damage, particularly when the flexible hose section ends are fixedly secured and the flexible section design is rigid with respect to rotational forces. Such dynamic torsional forces can lead to premature metal fatigue, cracking and failure of exhaust system components, including previous designs of flexible metal hose.

The present invention addresses these considerations in connection with the application of flexible metal hose to applications involving dynamic stresses. Heretofore there has not been available a dynamic stress controlling flexible hose section with the advantages and features of the present invention.

SUMMARY OF THE INVENTION

In the practice of the present invention, a flexible hose section is provided which includes a body with a corrugated medial portion and first and second ends with first and second mouths. The body mouths receive the ends of upstream and downstream exhaust system pipe sections and are secured therein by suitable connectors, such as weldments, clamps, gaskets and the like. The hose section, through the arrangements of its corrugations and/or its end connections, permits relative rotational displacement between the exhaust pipe sections whereby dynamic torsional stress is attenuated in and controlled by the hose section. Alternative embodiments of the present invention include various arrangements of corrugations, end connections and multiple hose section body layers, which can include intermediate insulation layers and outer sleeves for greater dynamic stress control and heat resistance.

OBJECTS AND ADVANTAGES OF THE INVENTION

The principle objects and advantages of the present invention include providing a flexible hose section adapted to control dynamic stresses; providing such a hose section which is adapted to control axial, lateral, diagonal and rotational stresses; providing such a hose section which attenuates and dissipates forces associated with differential rotational forces in a system; providing such a hose section which dissipates heat; providing such a hose section which can be either rigidly or flexibly connected to other components in a system; providing such a hose section which can be fabricated from a variety of different materials; providing such a hose section which can operate effectively in relatively severe operating conditions, such as those associated with vehicle exhaust systems; providing such a hose section which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2a is a side elevational view of a flexible hose section comprising a second alternative embodiment of the present invention, shown with its ends flared prior to clamping on pipe section ends.

FIG. 7b is an enlarged, fragmentary, cross-sectional view of the seventh alternative embodiment flexible hose section.

FIG. 9a is a side elevational view of a flexible hose section comprising a ninth alternative embodiment of the present invention.

FIG. 9b is an enlarged, fragmentary, cross-sectional view of the ninth alternative embodiment flexible hose section.

FIG. 10b is an enlarged, fragmentary, cross-sectional view of the tenth alternative embodiment flexible hose section.

DETAILED DESCRIPTION OF THE PREFERRED EMBODIMENTS

Introduction and Environment

Figure 1:
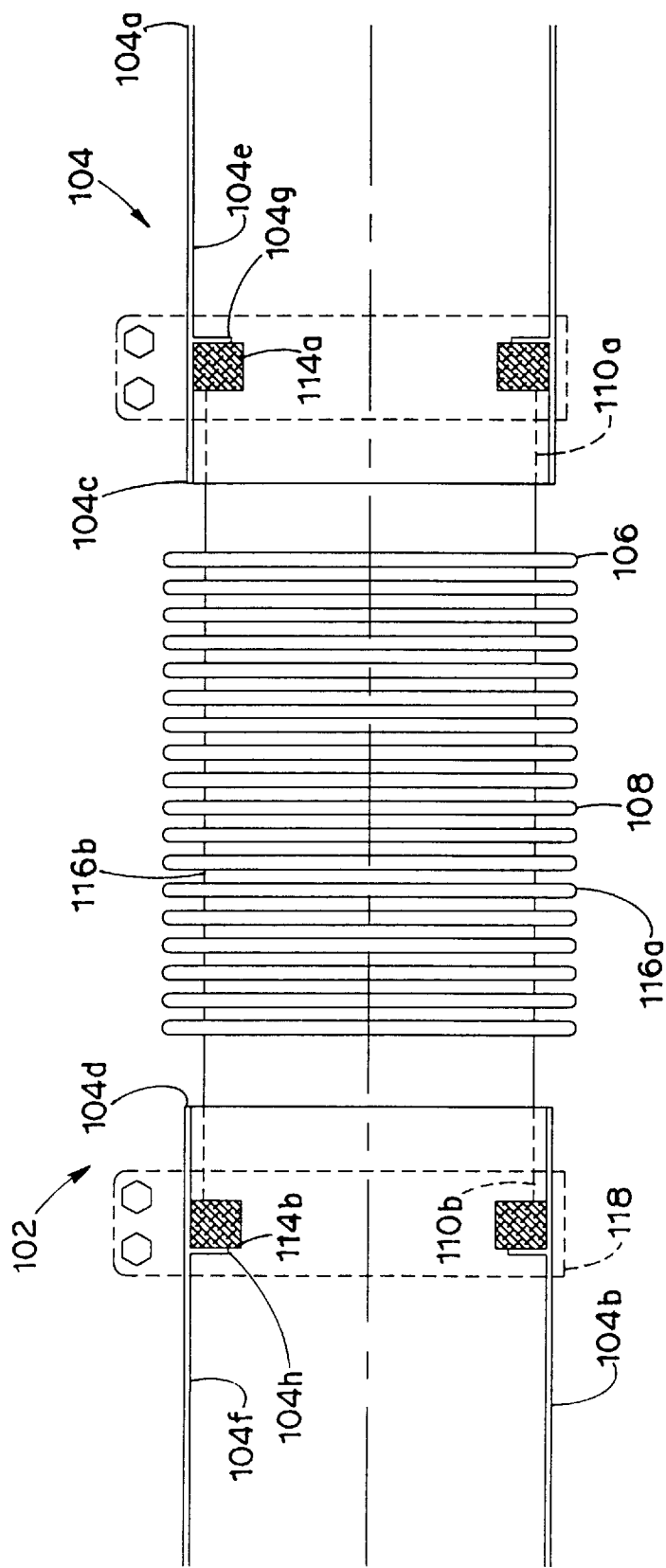
Fig. 1 is a side elevational view of a flexible hose section comprising a first alternative embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

I. Primary Embodiment Flexible Hose Section 102

Referring to the drawings in more detail, the reference numeral 102 generally designates a flexible hose section embodying the present invention. Without limitation on the generality of useful applications of the flexible hose section 102, it is shown in an exhaust system 104 with connecting upstream and downstream exhaust pipe sections 104a,b; upstream and downstream pipe section ends 104c,d; upstream and downstream pipe section bores 104e,f; and upstream and downstream annular, internal flanges 104g,h projecting inwardly into the bores 104e,f respectively.

Exhaust systems of many types can benefit from the flexible hose section 102. For example, exhaust systems from internal combustion engines on vehicles can effectively employ the dynamic force resisting characteristics of the connecting section 102. The exhaust pipe sections 104a,b can comprise, for example, rigid tubes, or can comprise other types of tubes, hoses or pipes, such as spiral-wound, edge-interlocked or corrugated flexible tubing. Relatively simple exhaust systems can be fabricated by using rigid tubing sections for the exhaust pipe sections 104a,b with the flexible hose section 102 joining same.

The flexible hose section 102 includes a body 106 with a medial portion 108 and first and second opposite ends 110a,b forming first and second mouths 112a,b respectively. The mouths 112a,b mount first and second gaskets 114a,b respectively. The gaskets 114a,b can comprise any material suitable for the particular application of the flexible hose section 102. For example, in an exhaust system a suitable high-temperature, resilient sealing material with suitable resiliency and compressibility can be utilized. Appropriate materials such as caulks and the like can also be utilized.

The body medial portion 108 includes a plurality of juxtaposed, annular corrugations 116 defining alternating lands 116a and grooves 116b. Although annular corrugations 116 are shown, they could also be spiral-wound, i.e., helical. The body ends 110a,b are extended into the exhaust pipe ends 104c,d with the gaskets 114a,b engaging the flanges 104g,h to form relatively fluid-tight seals between the connecting section 102 and the exhaust pipe sections 104a,b.

Band clamps 118 are mounted on the exhaust pipe section ends 104c,d for compressing the same onto the flexible hose section ends 110a,b in general, and onto the gaskets 114a,b in particular. The exhaust pipe section ends 104c,d can be slotted in a manner which is well known in the art in order to facilitate expansion and contraction by means of the clamps 118.

In operation, the gaskets 114a,b permit relative rotational or torsional movement between the flexible hose section 102 and the exhaust pipe sections 104a,b, whereby the connecting section 102 can rotate slightly at its ends 110a,b with respect to the exhaust pipe section ends 104c,d. The corrugations 116 accommodate other types of dynamic stresses, such as axial elongation and contraction, and lateral and diagonal displacement. The arrangement of the gaskets 114a,b and the corrugations 116 cooperate to provide relatively effective damping, attenuation or relief of the dynamic stresses and forces associated with the exhaust system 104.

A suitable type of band clamp 118 is shown in the Cassel U.S. Pat. No. 4,312,526 for Pipe Coupling with Open Sleeve, which is incorporated herein by reference.

II. Second Embodiment Flexible Hose Section 202

Figure 2B:
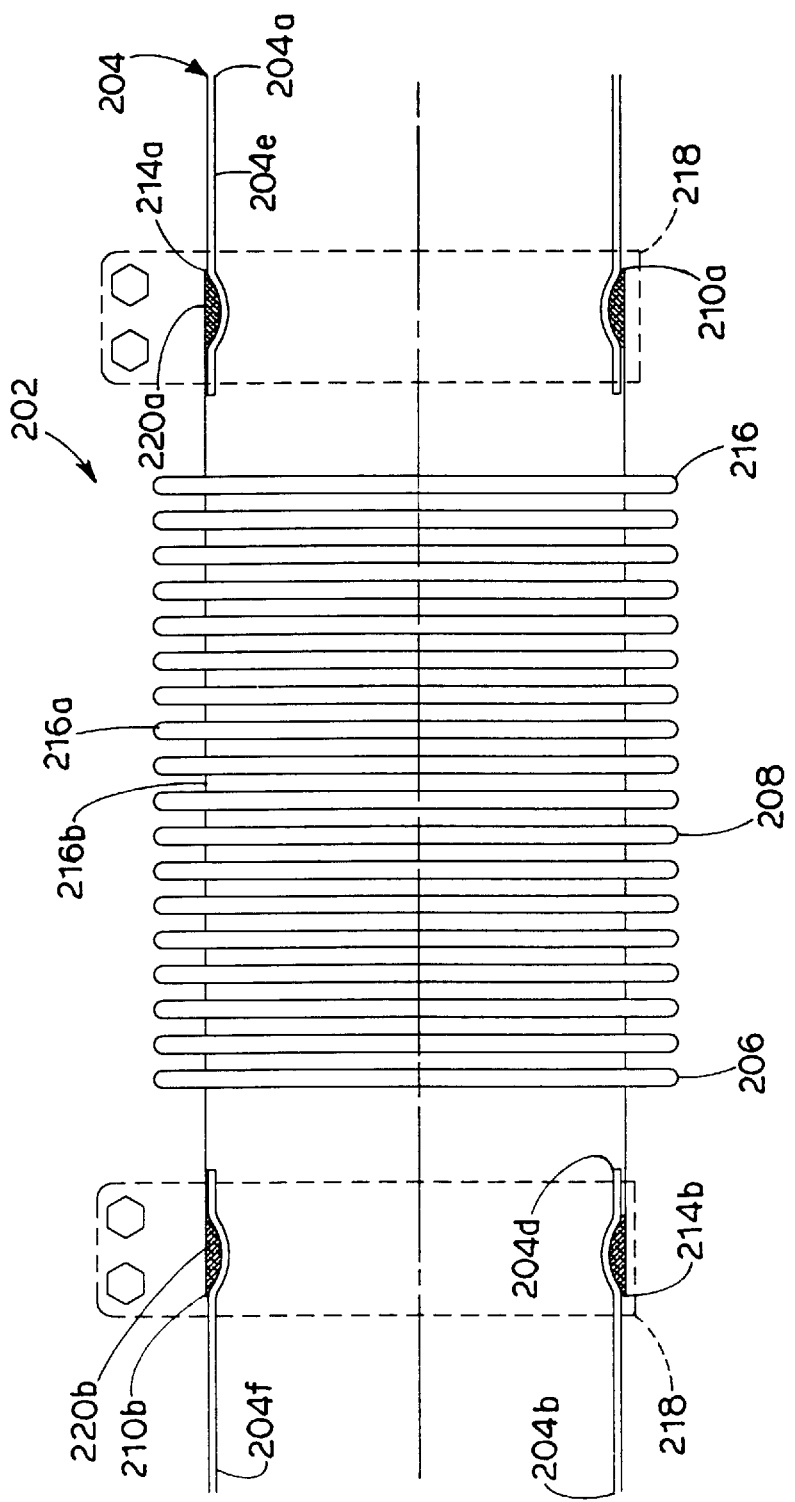
FIG. 2b is a side elevational view of the second alternative embodiment flexible hose section, shown with its ends clamped on the pipe section ends.

FIGS. 2a and 2b show a flexible hose section 202 comprising a second alternative embodiment of the present invention. The flexible hose section 202 is adapted for mounting in an exhaust system 204 including: upstream and downstream pipe sections 204a,b; upstream and downstream ends 204c,d; upstream and downstream bores 203e,f; and annular upstream and downstream channels 204g,h located in spaced relation from the respective ends 204c,d. The flexible hose section 202 includes a body 206 with a medial portion 208 and first and second ends 210a,b which form first and second mouths 212a,b. As shown in FIG. 2a, the body ends 210a,b are initially flared as shown at 214a,b to facilitate mounting on the exhaust pipe ends 204c,d. The body medial portion 208 includes a plurality of annular corrugations 216 including annular lands 216a and grooves 216b.

Clamps 218 are mounted on each flexible hose section end 210a,b with the exhaust pipe section ends 204c,d positioned therein. The clamps 218 compress the flares 214a,b and flatten first and second gaskets 220a,b within respective annular channels 204g,h whereby the body ends 210a,b are sealed with respect to the exhaust pipe section ends 204c,d. The gaskets 220a,b are generally annular and are preferably compressible to provide fluid-tight seals over significant contact areas of the exhaust system pipe section ends 204c,d and the connecting section ends 210a,b. The gaskets 220a,b permit limited relative movement, particularly rotational, between the exhaust pipe sections 204a,b and the connecting system body 206. Axial, lateral and angular displacement and the stresses associated therewith are also effectively absorbed and controlled by the cooperation of the components of the coupling section 202 with the exhaust system 204.

III. Third Alternative Embodiment Flexible Hose Section 302

Figure 3A:
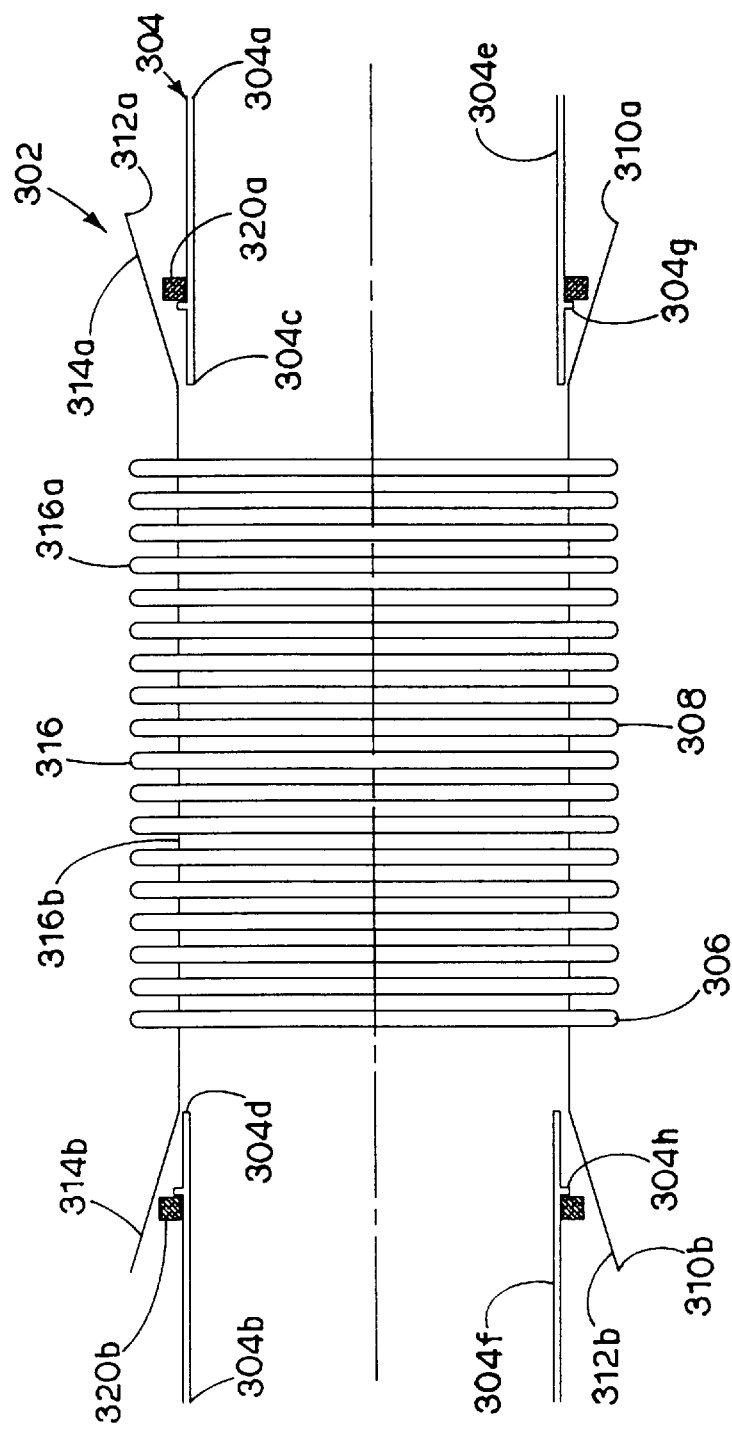
FIG. 3a is a side elevational view of a flexible hose section comprising a third alternative embodiment of the present invention, shown with its ends flared prior to clamping on pipe section ends.
Figure 3B:
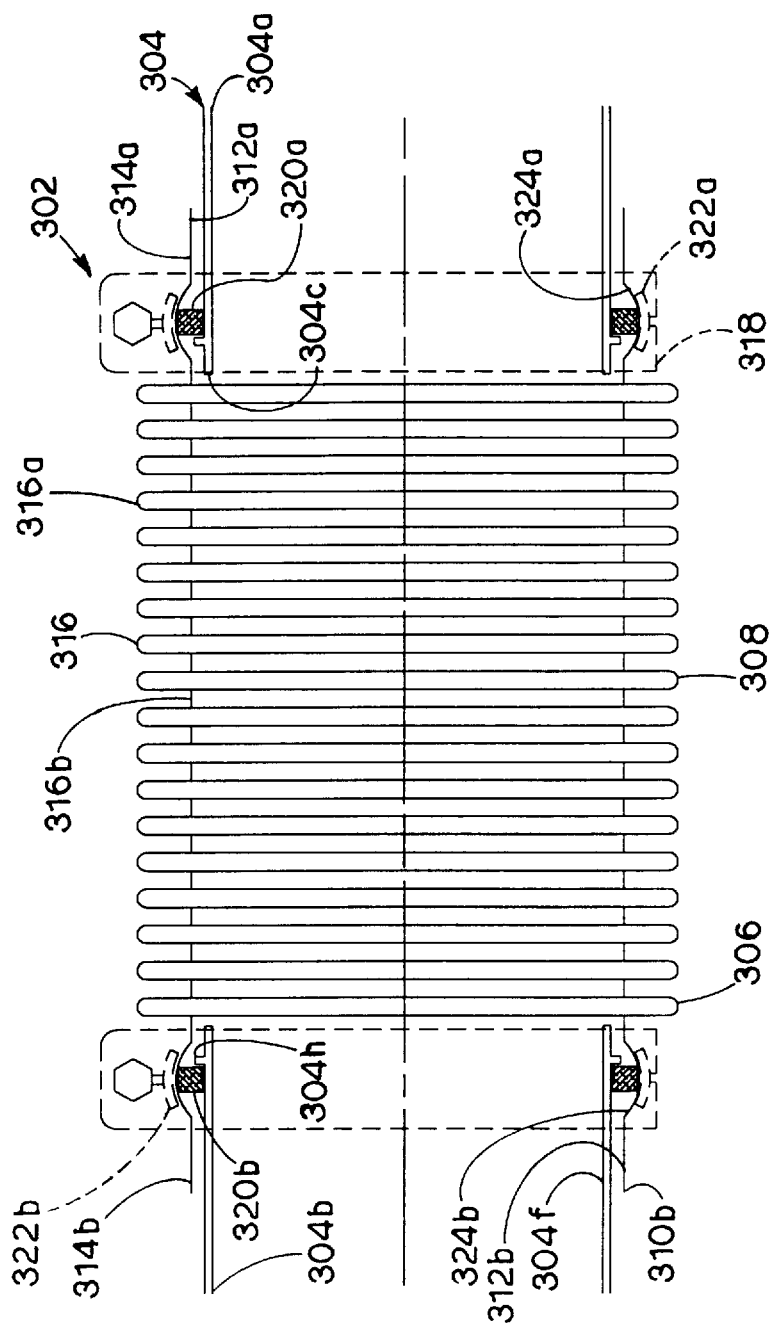
FIG. 3b is a side elevational view of the third alternative embodiment flexible hose section, shown with its ends clamped on the pipe section ends.

A flexible hose section 302 comprising a third embodiment of the present invention is shown in FIGS. 3a and 3b. Without limitation on the generality of useful applications of the flexible hose section 302, it is shown and described in an exhaust system 304. The exhaust system 304 includes a pipe with upstream and downstream pipe sections 304a,b which terminate at ends 304c,d respectively and which include bores 304e,f respectively extending along longitudinal axes thereof. Each pipe section 304a,b has an annular flange 304g,h respectively projecting outwardly therefrom in spaced relation from the pipe section ends 304c,d respectively.

The flexible hose, section 302 includes a body 306 with a medial portion 308 and first and second ends 310a,b with first and second mouths 312a,b. The flexible hose section ends 310a,b form first and second flares 314a,b respectively which facilitate insertion of the pipe section ends 304c,d by providing the flexible hose section ends 310a,b with sufficient diameters to clear the pipe section flanges 304g,h. The body medial portion 308 includes a plurality of corrugations 316 formed by multiple lands 316a and multiple grooves 316b.

A pair of clamps 318 are used for securing the connecting section ends 310a,b to the pipe section ends 304c,d with first and second gaskets 320a,b located therebetween. First and second annular compression rings 322a,b are provided in the clamps 318 in covering relation over the exhaust pipe section flanges 304g,h and the gaskets 320a,b respectively. The compression rings 322a,b have arcuate cross-sections to securely receive and retain the gaskets 320a,b in place against the exhaust pipe section flanges 304g,h. Moreover, the clamps 318 function to deform the connecting section body ends 310a,b to configurations as shown in FIG. 3b with inwardly-open, annular first and second channels 324a,b.

The third embodiment flexible hose connecting system 302 functions to absorb, attenuate and resist axial, lateral, angular and rotational movement between the connecting section 302 and the exhaust pipe sections 304a,b and the dynamic stress forces associated therewith. Moreover, the configurations and placements of the exhaust system flanges 304g,h; the gaskets 320a,b; the clamps 318 and the compression rings 322a,b cooperate to securely retain the flexible hose coupling section 302 in place on the exhaust pipe section ends 304c,d respectively and to prevent the hose connecting section 302 from being pulled off of the exhaust system sections 304a,b. Thus, relatively secure connections are provided between the connection system 302 and the exhaust pipe sections 304a,b.

IV. Fourth Alternative Embodiment Flexible Hose Section 402

Figure 4:
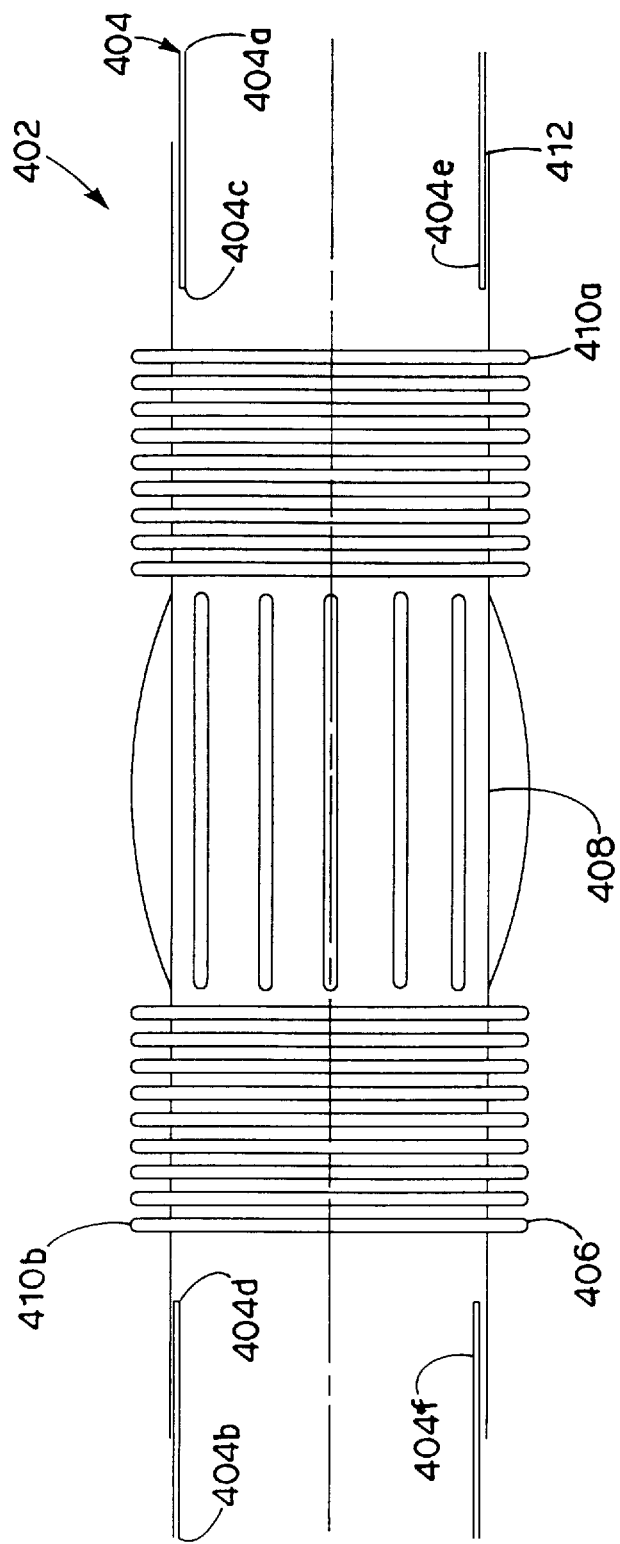
FIG. 4 is a side elevational view of a flexible hose section comprising a fourth alternative embodiment of the present invention.

A flexible hose section 402 comprising a fourth alternative embodiment is shown in FIG. 4 connecting upstream and downstream pipe sections 404a,b of an exhaust system 404. The exhaust system pipe sections 404a,b include upstream and downstream ends 404c,d and upstream and downstream pipe bores 404e,f terminating thereat.

The flexible hose section 404 includes a body 406 with a medial portion 408, first and second intermediate portions 410a,b; and first and second ends 412a,b which terminate at first and second mouths 414a,b. The ends 412a,b telescopically receive the pipe section ends 404c,d in connections which can be secured together, for example, by clamps, gaskets, welding, etc. whereby the pipe sections 404a,b are effectively fluidically joined.

The body medial portion 408 includes a plurality of circumferentially spaced longitudinal corrugations 416 with generally arcuate configurations projecting outwardly from the medial portion 408. The longitudinal corrugations 416 extend in generally parallel, spaced relation with respect to a longitudinal axis 418 of the hose section 402 and extend for most of the length of the body medial portion 408 between the body intermediate portions 410a,b. The longitudinal corrugations 416 include alternating lands and grooves 416a,b. Each intermediate portion 410a,b includes a plurality of juxtaposed, annular corrugations 420 with alternating lands and grooves 420a,b.

In operation, the combination of longitudinal and annular corrugations 416, 420 facilitates effective stress damping and dynamic force attenuation and control. More specifically, the longitudinal corrugations attenuate torsional stresses, such as those caused by differential twisting of the exhaust pipes 404a,b. The annular corrugations 420, on the other hand, accommodate other types of stress such as axial, lateral and diagonal stresses associated with corresponding displacements and differential vibrations of the exhaust pipes 404a,b with respect to each other. The ability of the flexible hose section 402 to accommodate a wide variety of dynamic forces associated with the exhaust pipe sections 404a,b enables the flexible hose section ends 412a,b to be fixedly attached to the exhaust pipe section ends 402c,d respectively since the stresses associated with the dynamic forces acting on the flexible hose section 402 can be dissipated by its corrugations 416, 420. Thus weldments 422 or clamps 424 can be utilized for making such end connections.

In operation, the longitudinal corrugations or ribs cooperate with the annular corrugations to effectively absorb, control and dissipate kinetic energy in the form of dynamic stress, e.g., axially, lateral, diagonal and rotational.

V. Flexible Hose Section 502

Figure 5:
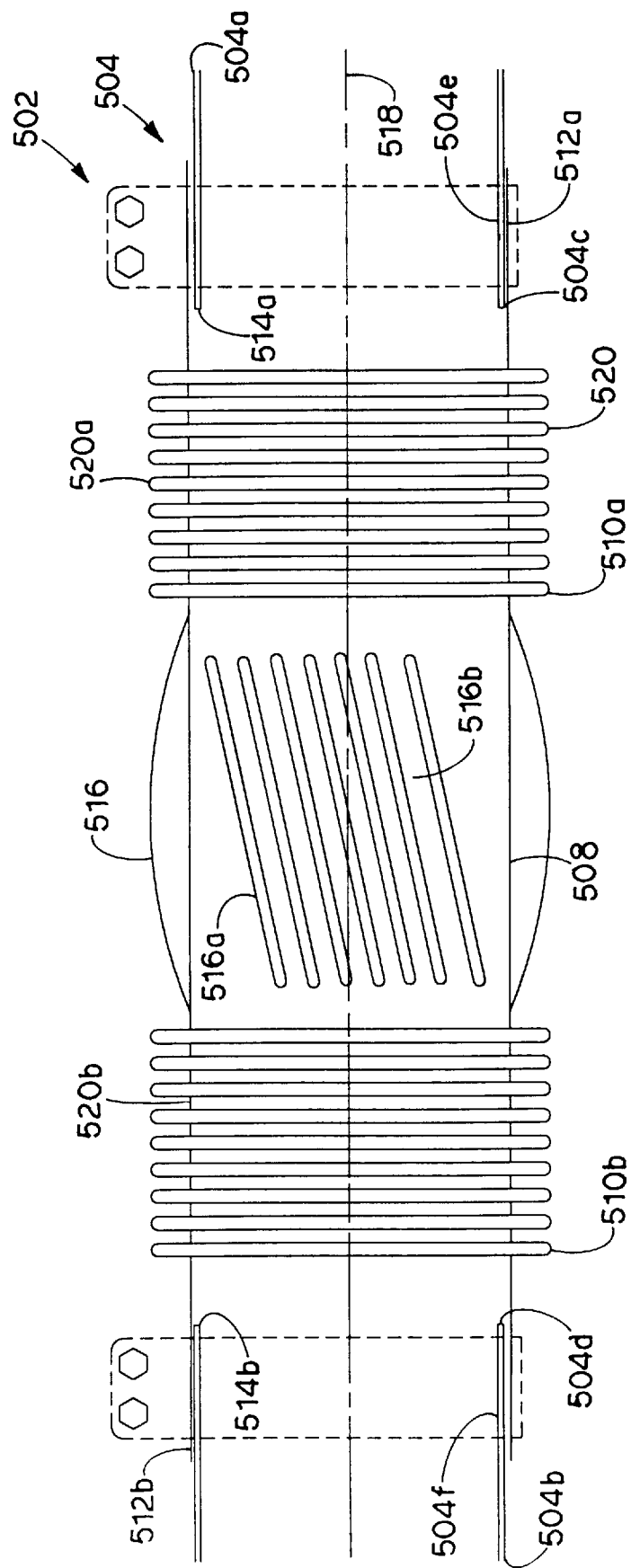
FIG. 5 is a side elevational view of a flexible hose section comprising a fifth alternative embodiment of the present invention.

FIG. 5 shows a flexible hose section 502 comprising a fifth embodiment of the present invention. Without limitation on the generality of the useful applications of the flexible hose section 502, it is shown in an exhaust system 504 with upstream and downstream pipe sections 504a,b; upstream and downstream pipe section ends 504a,b; and upstream and downstream pipe section bores 504e,f.

The flexible hose section 504 includes a body 506 with a medial portion 508, first and second intermediate portions 510a,b; and first and second ends 512a,b forming first and second mouths 514a,b. The body medial portion 508 includes a plurality of corrugations 516 comprising alternating lands and grooves 516a,b and extending along the body medial portion 508 in skewed, spaced relation with respect to the longitudinal axis 518 of the flexible hose section 502. The angular orientation of the corrugations 516, their number and their spacing can all be varied to suit the requirements of particular applications.

The body intermediate sections 510a,b include annular corrugations 520 with alternating lands 520a and grooves 520b.

The skewed and annular corrugations 516, 520 cooperate to provide dynamic stress absorbing characteristics and performance similar to that of the fourth embodiment flexible hose section 402.

VI. Sixth Embodiment Flexible Hose Section 602

Figure 6:
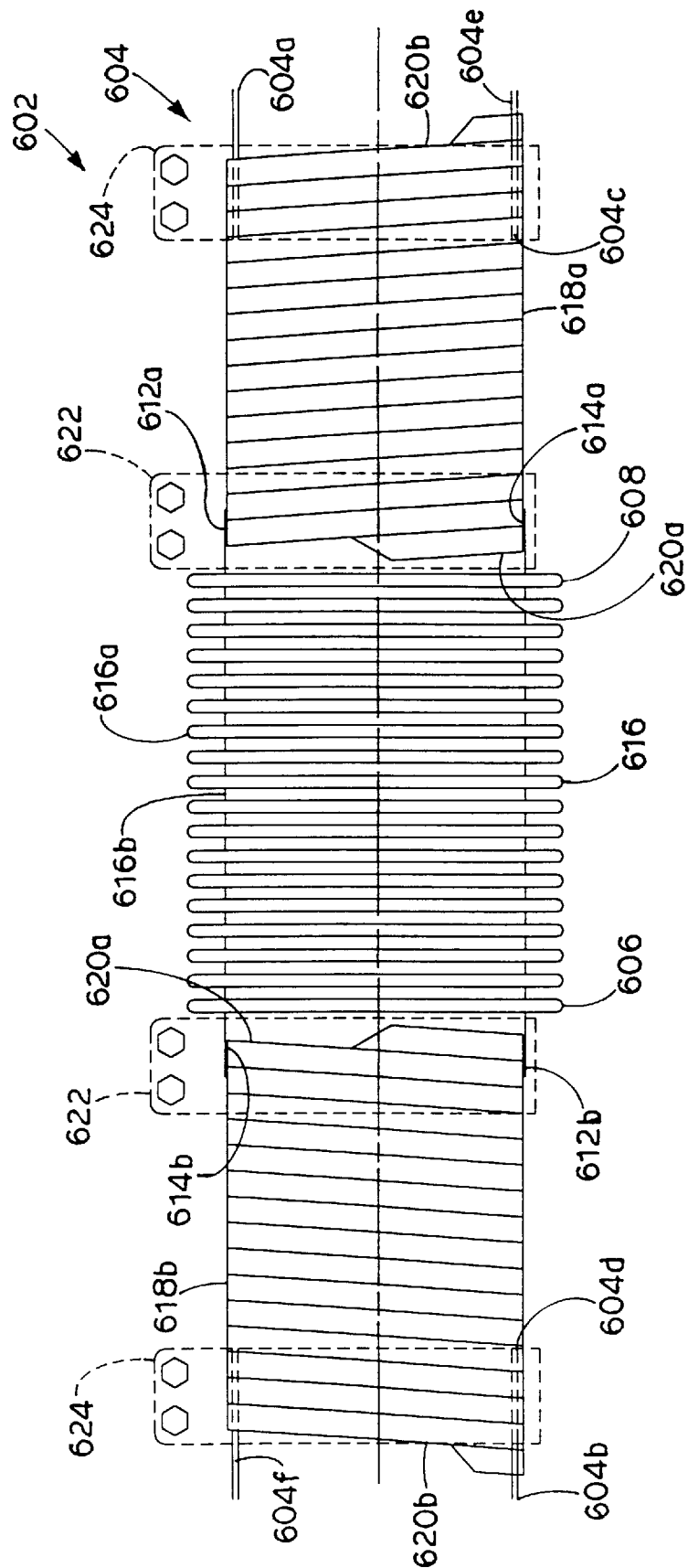
FIG. 6 is a side elevational view of a flexible hose section comprising a sixth alternative embodiment of the present invention.

FIG. 6 shows a flexible hose section 602 comprising a sixth embodiment of the present invention. Without limitation on the generality of useful applications of the flexible hose section 602, it is shown mounted on an exhaust system 604 with upstream and downstream pipe sections 604a,b; upstream and downstream ends 604c,d and upstream and downstream pipe section bores 604e,f.

The flexible hose section 602 includes a body 606 with first and second ends 606c,d and first and second pipe section bores 606e,f. The body 606 includes a medial portion 608 and first and second ends 612a,b forming first and second mouths 614a,b. The body medial portion 608 includes a plurality of annular corrugations 616 comprising alternating lands and grooves 616a,b.

First and second extensions 618a,b comprise lengths of spiral-wound, interlocked flexible hose or some other suitable flexible hose construction. The extensions 618a,b have respective inboard and outboard ends 620a,b. The extension inboard ends 620a are telescopically received in respective body mouths 614a,b and are secured to the body ends 612a,b by respective inboard clamps 622. The extension outboard ends 620b telescopically receive respective exhaust pipe section ends 604c,d and are secured thereto by respective outboard clamps 624.

In operation, the spiral-wound extensions 618a,b with interlocked edges cooperate with the corrugated body 606 to effectively resist and absorb various dynamic stresses transferred by the pipe sections 604a,b. For example, the extensions 618 can accommodate rotational displacement due to the spiral-wound, interlocked nature of their edges, which are adapted to permit limited sliding with respect to each other whereas the annular corrugations 616 of the body 606 are adapted to accommodate axial, lateral and diagonal stresses and loads.

VII. Seventh Embodiment Flexible Hose Section 702

Figure 7A:
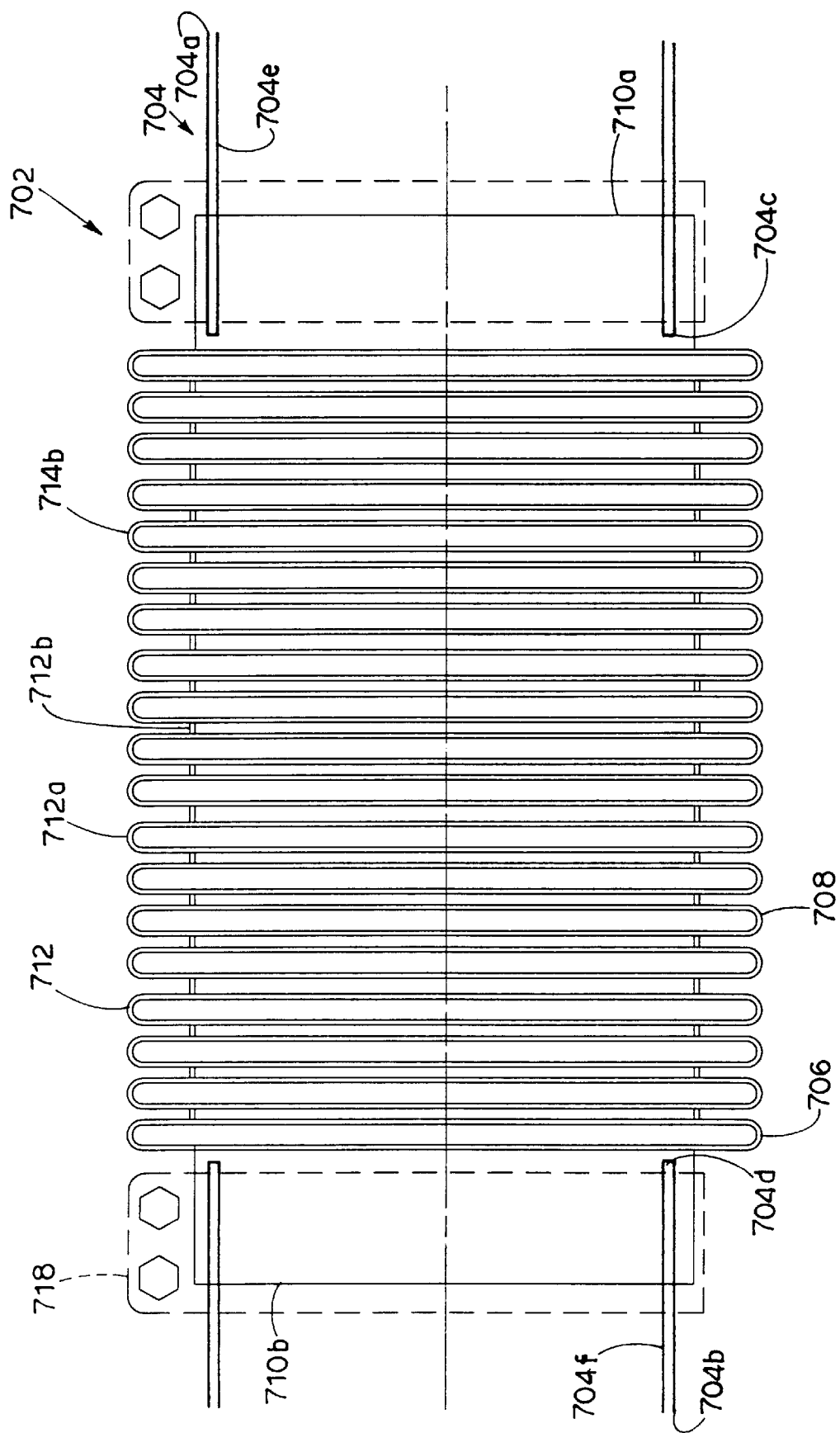
FIG. 7a is a side elevational view of a flexible hose section comprising a seventh alternative embodiment of the present invention.

A flexible hose section 702 comprising a seventh alternative embodiment of the present invention is shown in FIGS. 7a and 7b and is generally designated by the reference numeral 702. The flexible hose section 702 is shown in an exhaust system 704 including upstream and downstream pipe sections 704a,b with upstream and downstream ends 704c,d and upstream and downstream pipe section bores 704e,f.

The flexible hose section 702 includes a body 706 with a medial portion 708 and first and second body ends 710a,b. The body medial portion 708 includes a plurality of annular corrugations 712 comprising alternating lands and grooves 712a,b. The corrugated, medial portion 708 of the body 706 includes inner and outer corrugated layers 714a,b, which preferably comprise a suitable metal with characteristics appropriate to the desired applications, such as corrosion resistance, flexibility, strength, malleability, etc. For example, stainless steel, aluminum and other corrosion-resistant metals have been found appropriate for applications such as exhaust systems.

The inner body layer 714a forms the body first or upstream end 710a and the outer layer 714b forms the body second or downstream end 710b. The layers 714a,b are separated by an insulating material layer 714c which isolates the metal layers 714a,b from each other both mechanically and thermally. Moreover, the insulating layer 714c cooperates with the inner and outer layers 714a,b to reduce the transmission of vibrations between the inner and outer layers 714a,b, thus effectively vibrationally isolating the exhaust pipe sections 704a,b from each other.

The body upstream and downstream ends 710a,b are connected to the upstream and downstream pipe section ends 704c,d by suitable clamps 718. Variations on the arrangements of the layers 714 can be provided, as well as variations on the interconnections of the pipe section ends 704c,d and the body ends 710a,b. Moreover, the insulating layer 714c can comprise any suitable material, such as high-temperature insulation, fiberglass or the like.

VIII. Eighth Alternative Embodiment Flexible Hose Section 802

Figure 8A:
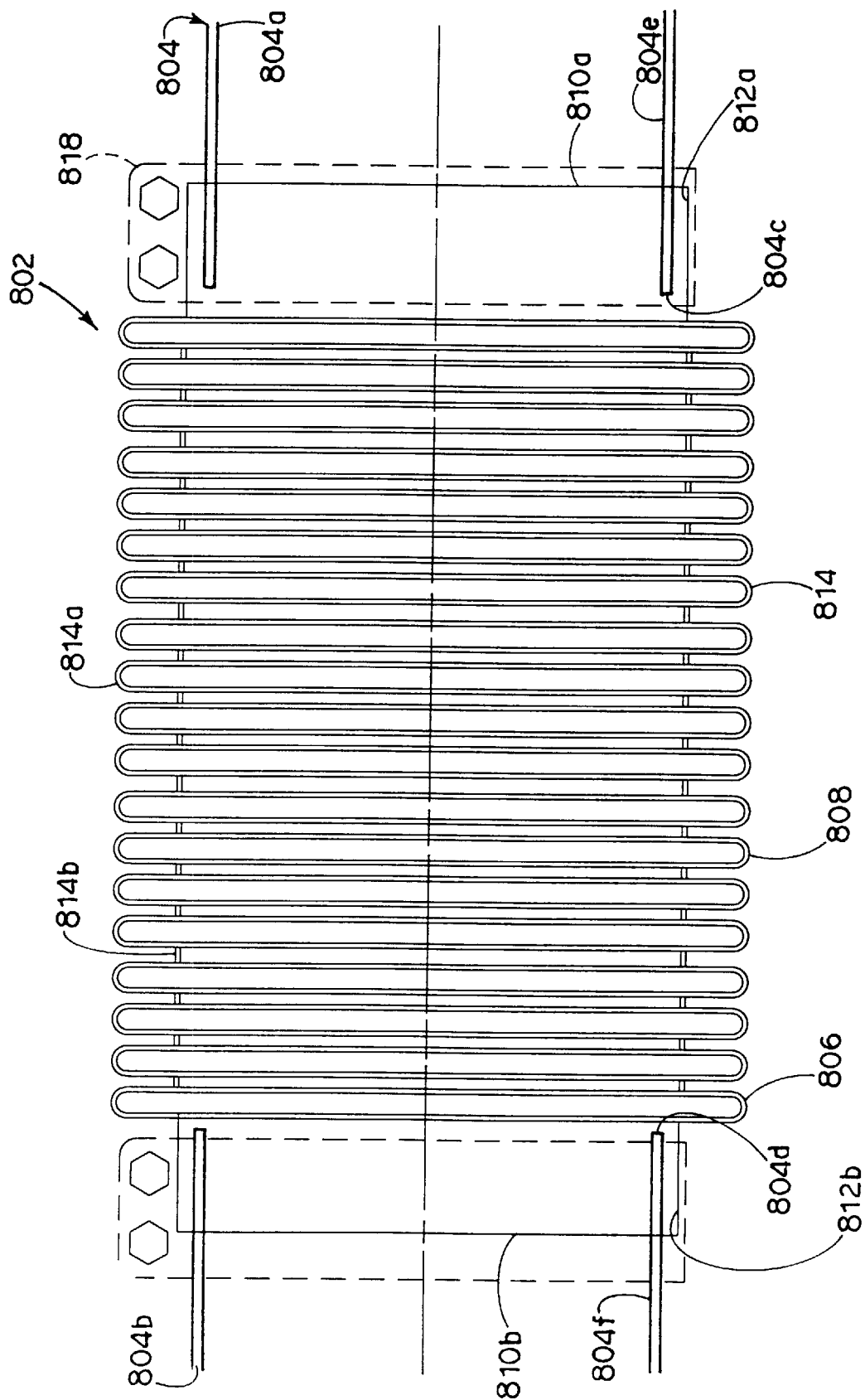
FIG. 8a is side elevational view of a flexible hose section comprising an eighth alternative embodiment of the present invention.
Figure 8B:
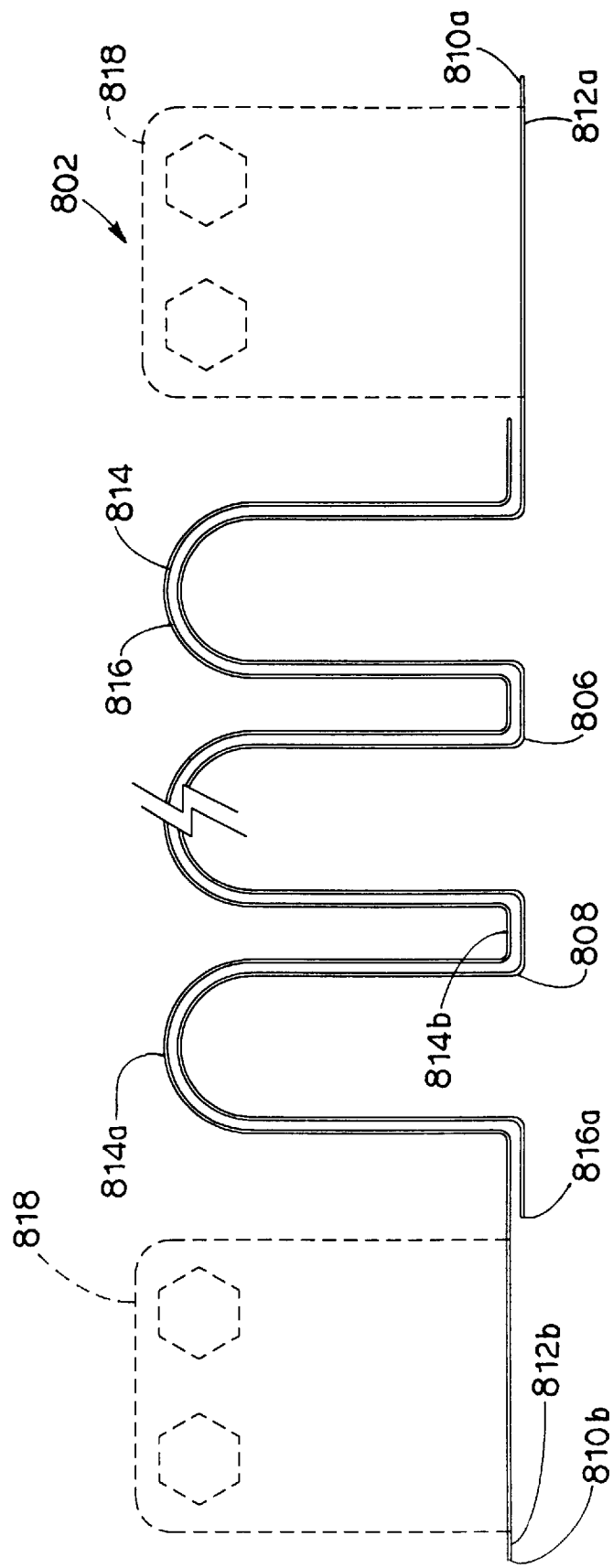
FIG. 8b is an enlarged, fragmentary, cross-sectional view of the eighth alternative embodiment flexible hose section.

A flexible hose section 802 comprising an eighth alternative embodiment of the present invention (FIGS. 8a and 8b) is shown in an exhaust system 804 including upstream and downstream pipe sections 804a,b with upstream and downstream ends 804c,d and upstream and downstream pipe section bores 804e,f.

The flexible hose section 802 includes a body 806 with a corrugated medial portion 808 and first and second ends 810a,b forming first and second mouths 812a,b. The body medial portion 808 includes a plurality of annular corrugations 814 with alternating lands and grooves 814a,b. The body 806 includes an inner layer 816a forming the first or upstream body end 810a connected to the first hose section 804a by a clamp 818 and an outer layer 816b forming a downstream or second end 810b connected to the exhaust pipe downstream end 804b by a clamp 818.

The overlying, adjacent body layers 816a,b can accommodate a certain amount of rotational slippage therebetween whereby rotational forces associated with the exhaust pipe sections 802a,b are dissipated by the flexible hose section 802. The rotational stress resistance of the overlying, adjacent body layers 816a,b cooperates with the corrugations 814, which accommodate and dissipate axial, lateral and diagonal forces. Moreover, the double layer arrangement of the body 806 facilitates heat dissipation by the body 806.

IX. Ninth Embodiment Flexible Hose Section 902

A flexible hose section comprising a ninth alternative embodiment of the present invention is shown in FIGS. 9a and 9b and is generally designated by the reference numeral 902. The flexible hose section 902 is adapted for use in an exhaust system 904 including upstream and downstream piping sections ends 904c,d and upstream and downstream section bores 904e,f. The flexible hose section 902 includes a body 906 with a medial portion 908 and first and second ends 910a,b having first and second mouths 912a,b.

The hose section body 906 includes annular corrugations 914a–d with diameters which increase as the corrugations 914 proceed inwardly with respect to the flexible hose section 902. Thus, the outermost corrugations 914a have the smallest diameters with successive corrugations 914b,c and d having progressively larger diameters. The proportions of the corrugations 914 and their respective diameters can be adjusted to accommodate the requirements of particular applications. The configurations of the corrugations 914, which converge outwardly, cooperate to provide a bellows-type configuration of the body 906 which can be particularly effective for dissipating vibrational stress. The stiffness of the body 906 tends to increase as the diameters of the corrugations 914 decrease whereby the greatest flexibility is provided by the innermost corrugations 914d, which have the greatest diameters and which tend to dissipate the greatest amount of dynamic stress related energy.

X. Tenth Alternative Embodiment Flexible Hose Section 1002

Figure 10A:
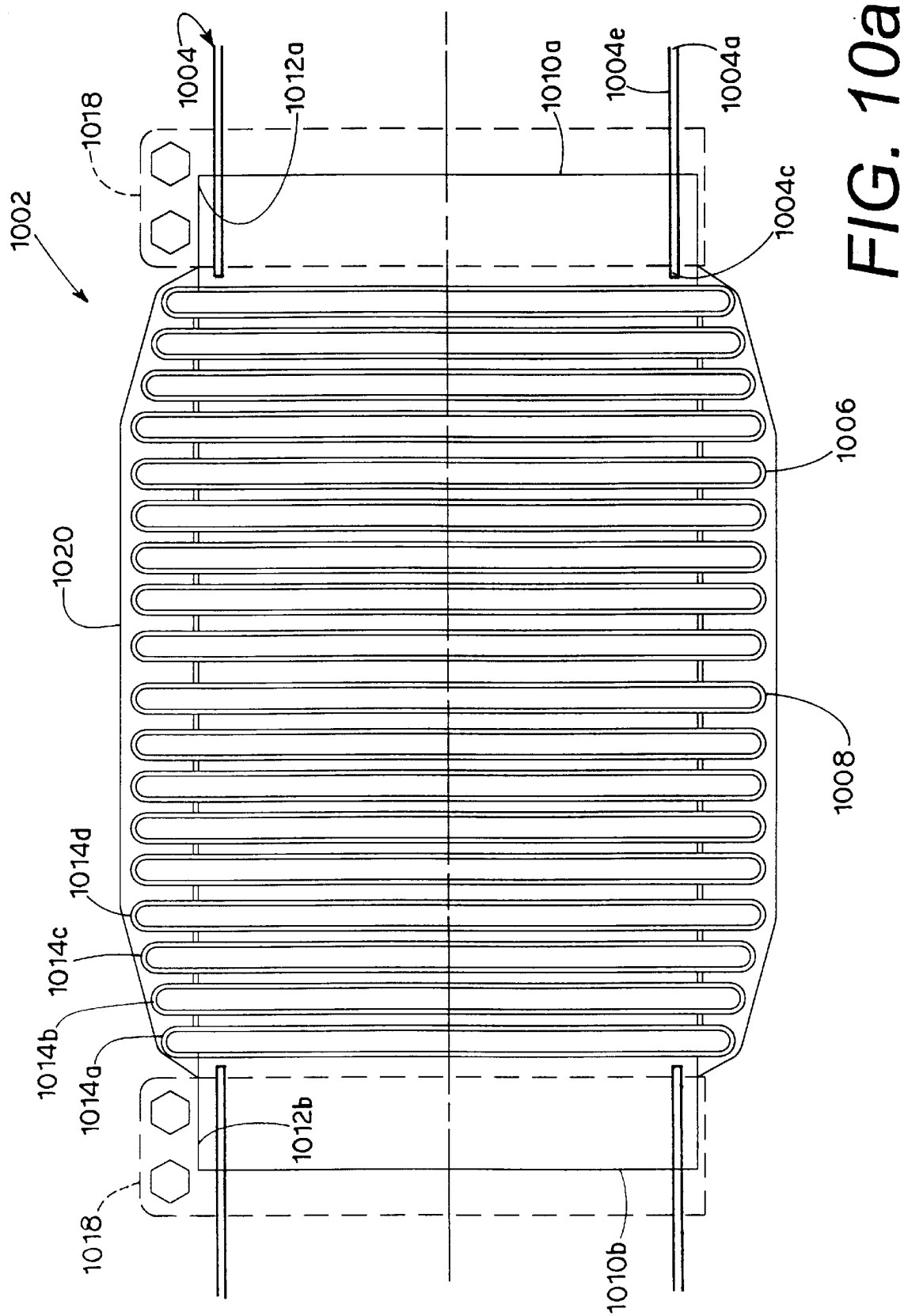
FIG. 10a is a side elevational view of a flexible hose section comprising a tenth alternative embodiment of the present invention.

A flexible hose section comprising a tenth alternative embodiment of the present invention is shown in Figs. 10a and 10b and is generally designated by the reference numeral 1002. The flexible hose section 1002 is adapted for an exhaust system 1004 including upstream and downstream pipe sections 1004a,b with upstream and downstream ends 1004c,d and upstream and downstream pipe section bores 1004e,f.

The flexible hose section 1002 includes a body 1006 with a corrugated, medial portion 1008 and first and second ends 1010a,b with first and second mouths 1012a,b. The body medial portion 1008 includes a plurality of annular corrugations 1014a–d with progressively increasing diameters forming a bellows configuration similar to that of the flexible hose section 902 described above. The flexible hose section body 1006 includes inner and outer corrugated layers 1116a,b forming the body first and second ends 1010a,b respectively and attached to the pipe section ends 1004c,d respectively by clamps 1118.

In addition to the structure of the flexible hose section 902 comprising the ninth alternative embodiment of the present invention, the tenth embodiment flexible hose section 1002 includes an outer, insulative sleeve comprising woven stainless steel wire braid with woven bands 1022 comprising multiple wire strands 1024. The disclosure of my copending U.S. patent application Ser. No. 08/675,933, assigned to a common assignee herewith, is incorporated herein by reference. The sleeve 1020 cooperates with the body corrugations 1004a–d and the multiple layers 1016a,b to further dissipate and attenuate dynamic stresses imparted to the flexible hose section 1002 from the exhaust system 1004. Moreover, the wire braid sleeve 1020 can comprise a suitable corrosion-resistant and thermally-conductive material, such as stainless steel for providing a protective, covering layer over the flexible hose section body 1006 and for dissipating both vibrational and thermal energy therefrom.

It is to be understood that while certain forms of the present invention have been illustrated and described herein, it is not to be limited to the specific forms or arrangement of parts described and shown.

What is claimed and desired to be secured by Letters Patent is as follows:

1. A flexible hose section for flexibly, rotatably, contractably and extendably connecting a pair of ends of upstream and downstream exhaust pipe sections, each said pipe section having an annular gasket retainer groove encircling its end and a relatively consistent thickness, which flexible hose section comprises:
    (a) a body with a longitudinal axis and first and second ends having open configurations adapted for receiving said upstream and downstream exhaust pipe ends respectively and closed configurations adapted for engaging said upstream and downstream exhaust pipe ends respectively;
    (b) said body having a medial section between its first and second ends;
    (c) a plurality of corrugations in said medial section; and
    (d) first and second end connection means adapted for connecting said body first and second ends to said upstream and downstream exhaust pipe ends respectively, each said end connection means including:
        (1) an annular O-ring gasket adapted for being received in a respective gasket retainer and including an inner perimeter adapted for engaging a respective exhaust pipe end and an outer perimeter engaging a respective body end; and
        (2) a band clamp receiving and engaging a respective body end over a respective gasket and including a pair of band clamp ends connected together, said band clamp being adapted to deform a respective body end from said open configuration to said closed configuration thereof, said band clamp further being adapted to deform said O-ring gasket from a first, generally circular cross-sectional configuration protruding outwardly from a respective gasket retainer groove to a second, flattened configuration generally contained within a respective gasket retainer groove.

2. A flexible hose section for flexibly, rotatably, contractably and extendably connecting a pair of ends of upstream and downstream exhaust pipe sections, each said pipe section having an outer, annular flange located at and projecting radially outwardly from its end, which flexible hose section comprises:
    (a) a body with first and second ends adapted for receiving said upstream and downstream exhaust pipe ends respectively and having a longitudinal axis;
    (b) said body having a medial section between its first and second ends;
    (c) a plurality of corrugations in said medial section; and
    (d) first and second end connection means adapted for connecting said body first and second ends to said upstream and downstream exhaust pipe ends respectively, each said connection means including:
        (1) an annular gasket engaging a respective flange and including an inner perimeter adapted for receiving and engaging a respective exhaust pipe and an outer perimeter received in and engaging a respective body end;
        (2) an inwardly-concave, arcuate compression ring receiving and engaging a respective body end over a respective gasket located therein; and
        (3) a band clamp receiving and engaging a respective compression ring and including a pair of band clamp ends bolted together.

3. A flexible hose section for flexibly, rotatably, contractably and extendably connecting a pair of ends of upstream and dowmstream exhaust pipe sections, each said pipe section having an outer, annular flange located at and projecting radially outwardly from its end, which flexible hose section comprises:

(a) a body with a longitudinal axis and first and second ends having open configurations adapted for receiving said upstream and downstream exhaust pipe ends respectively and closed configurations adapted for engaging said upstream and downstream exhaust pipe ends respectively;

(b) said body having a medial section between its first and second ends;

(c) a plurality of corrugations in said medial section; and (d) first and second end connection means adapted for connecting said body first and second ends to said upstream and downstream exhaust pipe ends respectively, each said end connection means including:

(1) an annular gasket adapted for engaging a respective flange and including an inner perimeter adapted for receiving and engaging a respective exhaust pipe end and an outer perimeter received in and engaging a respective body end;

(2) an inwardly-concave, arcuate cross-sectional compression ring receiving and engaging a respective body end over a respective gasket located therein; and (3) a band clamp receiving and engaging a respective body end over a respective gasket and including a pair of band clamp ends bolted together, said band clamp being adapted to deform a respective body end from said open configuration to said closed configuration thereof and forming an inwardly-open, annular groove within a respective body end, said groove receiving and capturing a respective compression ring.

* * * * *